United States Patent
Hasegawa

(10) Patent No.: US 7,443,538 B2
(45) Date of Patent: Oct. 28, 2008

(54) METHOD OF CONTROLLING PRINTED LINE QUALITY

(75) Inventor: Jun Hasegawa, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 677 days.

(21) Appl. No.: 10/991,475

(22) Filed: Nov. 19, 2004

(65) Prior Publication Data

US 2005/0134925 A1    Jun. 23, 2005

(30) Foreign Application Priority Data

Dec. 18, 2003   (KR) ...................... 10-2003-0093156

(51) Int. Cl.
*H04N 1/40*   (2006.01)

(52) U.S. Cl. .......................... 358/1.9; 358/2.1; 382/266; 382/258

(58) Field of Classification Search .................. 358/1.9, 358/2.1, 3.14–3.15, 1.2; 382/199–200, 260–269, 382/254, 256, 258
See application file for complete search history.

(56) References Cited

U.S. PATENT DOCUMENTS

| | | | | |
|---|---|---|---|---|
| 4,847,688 A | * | 7/1989 | Nishimura et al. | 348/172 |
| 5,164,717 A | * | 11/1992 | Wells et al. | 345/596 |
| 5,801,843 A | * | 9/1998 | Overton | 358/447 |
| 5,966,134 A | * | 10/1999 | Arias | 345/589 |

FOREIGN PATENT DOCUMENTS

EP   1308924 A2 *  5/2003

* cited by examiner

*Primary Examiner*—Thomas D Lee
*Assistant Examiner*—Stephen M Brinich
(74) *Attorney, Agent, or Firm*—Roylance, Abrams, Berdo & Goodman, LLP

(57) ABSTRACT

A printer embodied rendering algorithm for detecting and configuring positive and negative thin lines to be rendered such that when a bright-colored thin line on a dark background (negative thin line) is rendered and the result is stored in an RGB buffer in a printer system, the thin line thickness is increased only when the brightness of the line color is higher than a predetermined threshold value and the thin line thickness is smaller than a predetermined threshold value. According to the rendering algorithm, it is possible to prevent a negative thin line from disappearing or becoming thinner without increasing a positive thin line thickness, thereby improving the visibility of the thin line.

15 Claims, 2 Drawing Sheets

METHOD OF CONTROLLING PRINTED LINE QUALITY

CROSS-REFERENCE TO RELATED APPLICATIONS

This application claims the benefit under 35 U.S.C. § 119(a) of Korean Patent Application No. 2003-93156, filed in the Korean Intellectual Property Office on Dec. 18, 2003, the entire contents of which are incorporated herein by reference.

BACKGROUND OF THE INVENTION

1. Field of the Invention

The present invention relates to a rendering algorithm in a printer. More particularly, the present invention relates to a rendering algorithm which corrects an actual line thickness value stored in a buffer for rendering, based on the line thickness, the brightness of the line color, and the brightness of the background in document data to be printed by an inkjet or laser printer.

2. Description of Related Art

FIG. 1 is a block diagram showing a rendering process in a typical digital printer, such as an inkjet or laser printer.

A printer system which processes commands of an application 1 stored in a computer (not shown), typically comprises an information processing unit and a printing unit 8. The information processing unit comprises a rendering unit 2, an RGB (Red, Green, Blue) buffer 3, a color converting unit 4, a CMYK (Cyan, Magenta, Yellow, blacK) multi-value buffer 5, a half-toning unit 6, and a CMYK two-value buffer 7.

When a user performs a rendering process by manipulating the application 1 and executing a print command, the application 1 creates a series of drawing commands based on document data to be printed, and transmits the commands to a printer.

In response to the drawing commands, the rendering unit 2 performs rendering processes, and stores the results of the processes in the RGB buffer 3. At this point, drawing information such as types of drawing, coordinates indicating print locations, drawing colors, and the like, is transmitted from the application 1.

In case of line drawing, the drawing information comprises a line color, a line thickness, a line type, and coordinates of a starting point. The rendering unit 2 performs the rendering process according to the drawing commands transmitted from the application 1.

After the rendering is completed, the RGB values stored in the RGB buffer 3 are color-converted by the color converting unit 4, and the color-converted RGB values are then written into the CMYK multi-value buffer 5. This conversion is the process by which pixel colors represented by the RGB values on a monitor, are represented with a blend of toner or ink consisting of four colors, CMYK. At this point, in order to indicate a saturation value of CMYK, eight bits, that is, 256 gray scales, are typically used for each color.

The half-toning unit 6 converts the values in the CMYK multi-value buffer 5 into two-value data, and then writes the two-value data into the CMYK two-value buffer 7. The printing unit 8 affixes toner or ink to a print paper according to bit values in the CMYK two-value buffer 7, thereby completing the printing operation.

The toner or ink affixed to a print paper in printing however, typically has a dot gain, so that the toner or ink spreads around the outer edge of a pixel area.

Accordingly, when a black thin line with a single pixel width is drawn on a white background, the line is printed thicker than a theoretical value of the pixel size. While the effect of emphasis of the line thickness is more remarkable in a thinner line, there are few actual problems in employing this effect.

However, when a very thin line is drawn with a bright color on a dark background, the line appears to be thinner due to the dot gain, which is contrary to the aforementioned case of a black thin line drawn on a white background. When a white line with a single pixel width is drawn on a dark background in an RGB buffer with a rendering resolution of over 600 dpi, it is difficult or impossible to notice the line since the line printed on the page is too thin to see.

Where a positive thin line is a dark-colored thin line on a bright background, and a negative thin line is a bright-colored thin line on a dark background, an effect of the dot gain in printing is that the width of the positive thin line increases but the width of the negative thin line decreases.

Since the line thickness value is included in the commands received in the rendering unit, a solution to this problem has included programming the rendering process so that only a very thin line, that is, a line with a single pixel width, is thickly drawn.

However, this causes both the negative thin line and the positive thin line to become thicker, so that reproduction performance on a print paper is deteriorated in rendering of the positive thin line.

Accordingly, a need exists for a system and method for distinguishing between desired positive and negative thin lines, and adjusting line thickness to render improved negative thin lines without affecting positive thin lines.

SUMMARY OF THE INVENTION

The present invention provides a rendering algorithm embodied in a printer which improves the visibility of a bright-colored thin line on a dark background (negative thin line).

According to an object of the present invention, when a bright-colored thin line on a dark background is rendered, and the result of the rendering is stored in an RGB buffer in a printer system, a rendering algorithm is configured so that the thin line thickness is increased only when the brightness of the line color is higher than a predetermined threshold value and the thin line thickness is smaller than a predetermined threshold value.

The brightness of the line color may be calculated from Equation (1) below, including factors assigned to each color of the RGB buffer.

$$[(0.3 \times Red) + (0.6 \times Green) + (0.1 \times Blue)] \qquad (1)$$

According to another object of the present invention, when a bright-colored thin line on a dark background is rendered, and the result of the rendering is stored in a CMYK buffer in a printer system, a rendering algorithm used to render the line increases the thin line thickness only when the brightness of a line color is higher than a predetermined threshold value and the thin line thickness is smaller than a predetermined threshold value.

The brightness of the line color may be calculated from Equation (2) below, including factors assigned to each color of the CMYK buffer.

$$1.0 - [(0.3 \times Cyan) + (0.2 \times Magenta) + (0.1 \times Yellow) + (0.4 \times Black)] \qquad (2)$$

The factors (such as 0.1, 0.2, 0.3, and so forth) in each of Equations (1) and (2) are presented as examples, which sum to 1.0, and can be configured as required by the application.

BRIEF DESCRIPTION OF THE DRAWINGS

The above and other objects, features and advantages of the present invention will become more apparent by describing in detail, exemplary embodiments thereof with reference to the attached drawings in which.

Throughout the drawings, like reference numerals will be understood to refer to like parts, components and structures.

DETAILED DESCRIPTION OF THE EXEMPLARY EMBODIMENTS

Exemplary embodiments according to the present invention will now be described in greater detail with reference to the accompanying drawings.

Figure 1:
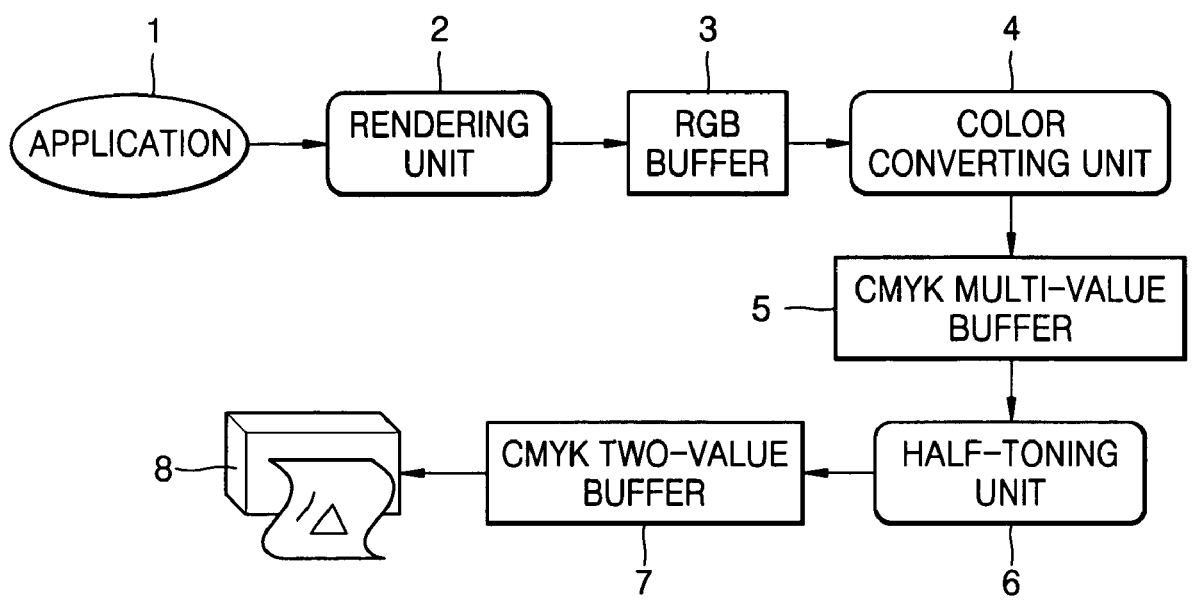
FIG. 1 is a block diagram showing a rendering process in a typical digital printer.
Figure 2:
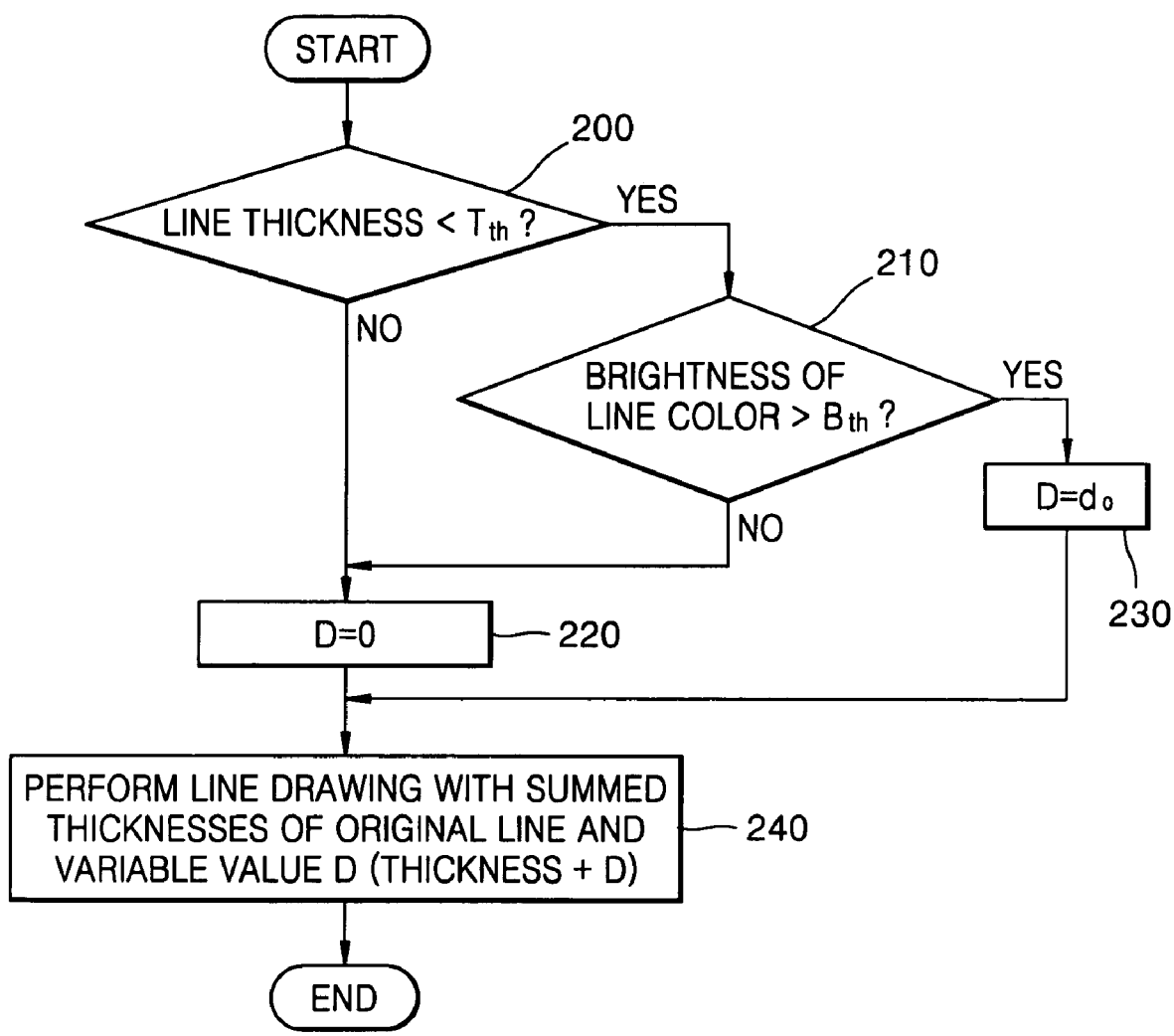
FIG. 2 is a flowchart showing a rendering algorithm according to an embodiment of the present invention.

The present embodiments have substantially the same structure as the prior art shown in FIG. 1, except that a rendering process of line drawing in the rendering unit 2 employs a rendering algorithm as shown in greater detail in FIG. 2.

FIG. 2 is a flowchart showing the execution of a rendering algorithm of the line drawing according to an embodiment of the present invention. The algorithm is embodied in a printer component and is executed to correct an actual line thickness value stored in a buffer for rendering, based on the line thickness, the brightness of the line color, and the brightness of the background.

In the method shown in FIG. 2, it is first determined whether the line thickness to be drawn is smaller than a first threshold value $T_{th}$ in step 200. The first threshold value $T_{th}$ denotes a predetermined threshold value based on the line thickness.

If the line thickness is smaller than the first threshold value $T_{th}$ in step 200, it is then determined whether the brightness calculated from the color of the line to be drawn is higher than a predetermined second threshold value $B_{th}$ in step 210. The brightness of the line color can be calculated from Equation (1), repeated below including factors assigned to each color of the RGB buffer 3.

$$\text{Brightness of line color} = [(0.3 \times \text{Red}) + (0.6 \times \text{Green}) + (0.1 \times \text{Blue})] \quad (1)$$

If the brightness of the line color is higher than the second threshold value $B_{th}$ in step 210, a predetermined thickening value do is assigned to a variable D in step 230. If the line thickness is larger than the first threshold value $T_{th}$ in step 200, zero is assigned to the variable D in step 220. In step 240, the line drawing is performed having a line thickness equal to the summed thicknesses of the original line and the variable D value. The aforementioned steps, or operations, enable the line thickness to be increased only when a thin line is drawn with a bright color (negative thin line).

The aforementioned determination condition however, does not take into account a background value, so that determination is not made on each occasion concerning the negative thin line. However, this determination condition alone can efficiently solve problems in an actual use of a printer.

In addition, when the rendering unit renders the print data and directly stores the result of the rendering in the CMYK multi-value buffer 5 or two-value buffer 7, rather than in the RGB buffer 3, the same effect can be obtained by applying parameters relevant to the brightness of a line color in printing according to Equation (2), repeated below including factors assigned to each color of the CMYK buffer, instead of Equation (1).

$$\text{Brightness of line color} = 1.0 - [(0.3 \times \text{Cyan}) + (0.2 \times \text{Magenta}) + (0.1 \times \text{Yellow}) + (0.4 \times \text{Black})] \quad (2)$$

Rendering of print data stored in such a CMYK buffer is widely employed since there are many advantages in terms of the processing speed, amount of used memory, and the like.

It will be understood by those skilled in the art that the present invention is not limited to rendering of print data stored in an RGB buffer, but can also be applied to print data stored in other buffers, such as a CMYK buffer.

According to the rendering algorithm embodied in a printer according to an embodiment of the present invention, it is possible to prevent a negative thin line from disappearing or becoming thinner, without increasing a positive thin line thickness in printing, and thereby improve the visibility of the thin line.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method to control printed line quality using a rendering algorithm, comprising the steps of:
    determining a thickness of a line to be rendered;
    determining a brightness of the line to be rendered;
    determining if the brightness of the line is greater than a first predetermined threshold value and if the thickness of the line is less than a second predetermined threshold value; and
    increasing the thickness of the line to be rendered if the brightness of the line is greater than the first predetermined threshold value and the thickness of the line is less than the second predetermined threshold value.

2. The method according to claim 1, wherein the line to be rendered is a bright-colored thin line on a dark background which is determined to have a brightness that is greater than the first predetermined threshold value and a thickness that is less than the second predetermined threshold value, such that the thickness of the line to be rendered is increased.

3. The method according to claim 1, further comprising the step of storing the result of the rendering in an RGB buffer.

4. The method according to claim 3, wherein the step of determining the brightness of the line further comprises the step of:
    determining the brightness of the line from equation, $$[(a \times \text{Red}) + (b \times \text{Green}) + (c \times \text{Blue})]$$

wherein Red, Green, and Blue represent values stored in the RGB buffer, and a, b, and c represent factors assigned to each value, respectively.

5. The method according to claim 4, wherein a is approximately 0.3, b is approximately 0.6, and c is approximately 0.1.

6. The method according to claim 4, further comprising the step of:
    implementing the determination of the thickness of the line and the brightness of the line using an algorithm embodied by a rendering unit.

7. The method according to claim 1, wherein the step of increasing the thickness of the line to be rendered further comprises the step of:
   setting an increased thickness value equal to a summation of the determined line thickness value and a variable value; and
   wherein the variable value is set to approximately zero if the determined line thickness is greater than or equal to the second predetermined threshold value, and wherein the variable value is set to a predetermined thickening value if the determined line thickness is less than the second predetermined threshold value.

8. The method according to claim 1, further comprising the step of storing the result of the rendering in a CMYK buffer.

9. The method according to claim 8, wherein the step of determining the brightness of the line further comprises the step of:
   determining the brightness of the line from equation, $$1.0-[(d \times Cyan)+(e \times Magenta)+(f \times Yellow)+(g \times Black)]$$

wherein Cyan, Magenta, Yellow, and Black represent values stored in the CMYK buffer, and d, e, f, and g represent factors assigned to each value, respectively.

10. The method according to claim 9, wherein d is approximately 0.3, e is approximately 0.2, f is approximately 0.1, and c is approximately 0.4.

11. A method to control printed line quality using a rendering algorithm, comprising the steps of:
    determining a thickness of a line to be rendered;
    determining a brightness of the line to be rendered;
    determining if the brightness of the line is greater than a first predetermined threshold value and if the thickness of the line is less than a second predetermined threshold value; and
    increasing the thickness of the line to be rendered if the brightness of the line is greater than the first predetermined threshold value and the thickness of the line is less than the second predetermined threshold value, wherein the result of the rendering is stored in a CMYK buffer.

12. The method according to claim 11, wherein the line to be rendered is a bright-colored thin line on a dark background which is determined to have a brightness that is greater than the first predetermined threshold value and a thickness that is less than the second predetermined threshold value, such that the thickness of the line to be rendered is increased.

13. The method according to claim 11, wherein the step of determining the brightness of the line further comprises the step of:
    determining the brightness of the line from equation, $$1.0-[(0.3 \times Cyan)+(0.2 \times Magenta)+(0.1 \times Yellow)+(0.4 \times Black)]$$

wherein Cyan, Magenta, Yellow, and Black represent values stored in the CMYK buffer.

14. The method according to claim 13, further comprising the step of:
    implementing the determination of the thickness of the line and the brightness of the line using an algorithm embodied by a rendering unit.

15. The method according to claim 11, wherein the step of increasing the thickness of the line to be rendered further comprises the step of:
    setting an increased thickness value equal to a summation of the determined line thickness value and a variable value; and
    wherein the variable value is set to approximately zero if the determined line thickness is greater than or equal to the second predetermined threshold value, and wherein the variable value is set to a predetermined thickening value if the determined line thickness is less than the second predetermined threshold value.

* * * * *